United States Patent Office 3,294,865
Patented Dec. 27, 1966

3,294,865
CURING OF EPOXY RESINS WITH POLYCARBOXYLATES, POLYHYDRIC PHENOLS OR POLYHYDRIC ALCOHOLS AND, AS AN ACCELERATOR, AN ALKALI METAL SALT
Herbert P. Price, Louisville, Ky., assignor to Celanese Coatings Company, Inc., a corporation of Delaware
No Drawing. Filed Dec. 13, 1965, Ser. No. 513,546
10 Claims. (Cl. 260—837)

This is a continuation in part of my copending application Serial Number 32,139, filed May 27, 1960, now abandoned.

This invention relates to the curing of polyepoxides. In one of its aspects, the invention relates to the use of accelerators for known resin curing agents. In still another of its aspects, the invention relates to the preparation of films and to such useful products as encapsulating materials, laminates, pottings, castings and the like from epoxide resins.

Polyepoxides are thermosetting resins which can be converted with a wide variety of cross linking agents to insoluble infusible solids. The commercial utility of these resins is attributable, at least in part, to the fact that wide variations are possible in properties due to formulations. Polyepoxide formulations are curing systems which generally include polycarboxylic acids or anhydrides, polyhydric phenols, polyhydric alcohols, polyamines or polyamides as cross linking agents with or without modifiers or diluents. Cross linking agents for polyepoxides should have not only relatively long pot lives, but also moderate curing schedules. As a consequence, amines and amides, because of their desirable curing schedules, are by far the most commercial cross linking agents.

In accordance with an embodiment of this invention polyepoxides are cured with polyacids, polycarboxylic acid anhydrides, polyalcohols or polyphenols using accelerators or activators not heretofore suggested. It has been found that certain salts are capable of accelerating the reaction between polyepoxides and these curing agents. At a given temperature and with a particular polyepoxide, low curing temperatures can be used and at a given curing temperature, fast curing times can be achieved.

The compositions contemplated by this invention are heat curable compositions made from a polyepoxide having a 1,2 epoxy equivalency greater than one, a cross linking agent which is a polycarboxylic acid, a polycarboxylic acid anhydride, a polyhydric phenol or a polyhydric alcohol and a curing accelerator which is a sodium, potassium, lithium or ammonium bromide, iodide or thiocyanate, or lithium or ammonium chloride. The curing accelerators are used in the amounts of about 0.05 to about 1.0 weight percent based on the total weight of the polyepoxide and cross linking agent. A particularly desirable salt is lithium iodide. Others are lithium bromide and lithium chloride. Also included are sodium iodide, sodium bromide, potassium iodide, ammonium thiocyanate, ammonium chloride, potassium thiocyanate, ammonium bromide, sodium thiocyanate, etc. Considering the halides, the higher molecular weight halogen salts are more effective than the lower, iodine salts being more effective than bromine salts and bromine salts being more effective than chlorides. Considering the alkali metals, their effectiveness is not related to their molecular weight. Lithium salts are more effective than potassium salts and potassium salts are more effective than sodium salts. Sodium chloride and potassium chloride have been found to be ineffective, due probably to their insolubility in the compositions.

Epoxide resins with which this invention is concerned are the well known polyepoxides, and hence need not be discussed at length herein. Such compounds have epoxy equivalents greater than one and have epoxide equivalent weights of about 50 to about 4000. Preferred polyepoxides are glycidyl polyethers having a 1,2-epoxy equivalency greater than one and a weight per epoxide of from about 140 to 4000, desirably 2000. Glycidyl polyethers are made from the reaction of a polyhydric phenol with epihalohydrin or glycerol dihalohydrin and a sufficient amount of caustic alkali to combine with the halogen of the halohydrin. Products resulting from the reaction of a polyhydric phenol with, for example, epichlorohydrin or glycerol dichlorohydrin are monomeric or straight chain polymeric products characterized by the presence of at least two epoxide groups. Dihydric phenols that can be used for this purpose include Bisphenol A (bis(4-hydroxyphenyl)-2,2-propane), resorcinol, catechol, hydroquinone, methyl resorcinol, 2,2 - bis(4 - hydroxyphenyl) butane, 4,4' - dihydroxybenzophenone, bis(4 - hydroxyphenyl) ethane, and 1,5 - dihydroxynaphthalene. The preparation of polyepoxides from polyhydric phenols and epihalohydrin is described in U.S. Patents 2,467,171, 2,582,985, 2,538,072, 2,615,007 and 2,698,315, the proportion of the halohydrin (epichlorohydrin or glycerol dichlorohydrin) to dihydric phenol being at least from about 1.2 to 1 to about 10 to 1.

Higher melting point resins are made from the reaction of such resins with a further amount of dihydric phenol less than that equivalent to the epoxide content of the resin, as set forth in U.S. Patent 2,615,008. Halohydrins can be further exemplified by 3-chloro-1,2-epoxybutane, 3-bromo,-1,2-epoxyhexane, 3-chloro-1,2-epoxy octane, and the like. Another group of glycidyl polyethers is produced by the reaction of a polyhydric alcohol with epichlorohydrin or glycerol dichlorohydrin as disclosed in Zech Patent 2,581,464.

Also suitable polyepoxides are epoxyalicyclic esters such as 3,4 - epoxycyclohexylmethyl - 3,4 - epoxycyclohexanecarboxylate, 3,4 - epoxy - 6 - methylcyclohexylmethyl - 3,4 - epoxy - 6 - methylcyclohexanecarboxylate, bis(3,4 - epoxycyclohexylmethyl) sebacate, and 1,5 - pentanediol bis-(3,4-epoxycyclohexanecarboxylate). These epoxyalicyclic esters are prepared by reacting unsaturated aldehydes with butadiene to form cyclic aldehydes. The cyclic aldehydes can be condensed by the Tischenko reaction to form esters. The cyclic aldehydes can also be reduced to form alcohols which can subsequently be reacted with acids to form esters, or they can be oxidized to acids which can be reacted with alcohols to form esters. The resulting esters are then epoxidized with a peracid to form a polyepoxide. Representative of such polyepoxides are:

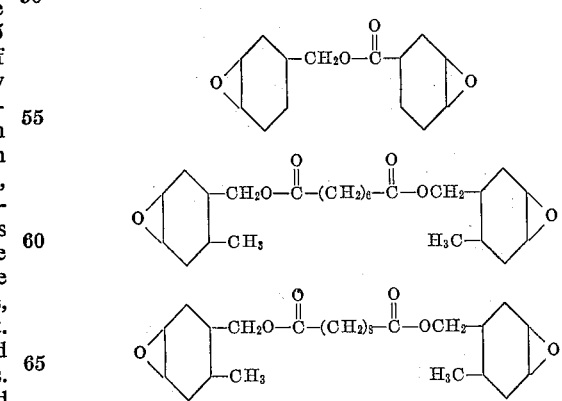

Such compounds are generally free of hydrolyzable chlorine atoms, due to the method of manufacturing them. Polyepoxides of this type are described in U.S. 2,716,123, 2,745,847, 2,750,395, and 2,863,881.

Other useful polyepoxides are epoxidized hydrocarbons, for instance, vinylcyclohexene dioxide, dicyclopentadiene dioxide, butadiene dioxide, and epoxidized polymers and copolymers of butadiene.

Additional polyepoxides are epoxidized unsaturated vegetable oils, such as epoxidized soybean oil, epoxidized linseed oil, epoxidized tall oil, and the like. Other polyepoxides include glycidyl esters of polybasic acids, for example diglycidyl terephthalate, diglycidyl adipate and diglycidyl esters of dimerized fatty acids. Additional polyepoxides useful in this invention are described in "Epoxy Resins," by Lee and Neville, McGraw-Hill Book Company, Inc., New York (1957).

With respect to these polyepoxides, the epoxide equivalent represents the weight of the product which contains and is equivalent to one epoxide group. The epoxide equivalent of epoxy compounds is determined by titrating a one gram sample with an excess of pyridine containing pyridine hydrochloride (made by adding 16 cc. of concentrated hydrochloric acid per liter of pyridine) at the boiling point for twenty minutes and back titrating the excess of pyridine hydrochloride with 0.1 N sodium hydroxide using phenolphthalein as indicator, and considering one HCl as equivalent to one epoxide group.

In carrying out the process of this invention, the polyepoxide, the curing agent and the particular salt are mixed and the mixture is heated at an elevated temperature to effect a cure. Since it will be desirable to employ the salts as liquids aqueous solutions can be prepared. However, dilute alcohol solutions are even more desirable because of the lower boiling point of the alcohol. The curing temperature is in the range of 90° C. to 200° C., normally 120° C. to 160° C. However, a temperature of somewhat less than 120° C. can be employed when polyepoxides having higher weights per epoxide are employed, because these polyepoxides generally contain a larger number of hydroxyl groups.

The amount of anhydride curing agent employed with the salt in the practice of the invention will vary over a wide range depending upon its structure. In general, good cures are obtained by reacting the anhydride with the polyepoxide in a ratio of 0.5 to 1 anhydride equivalent per epoxide equivalent. By anhydride equivalent is meant the weight of the anhydride per anhydride group. In effecting the cure, in this instance the temperature range will vary somewhat with the particular anhydride and also with the amount of activator used. Excellent rates of cure are obtained at temperature ranging from about 100° C. to 200° C. or higher.

Any of the known anhydride curing agents are incorporated in the composition in accordance with this aspect of the invention. Dibasic acid anhydrides such as phthalic acid anhydride are very suitable. Dicarboxylic acid anhydrides applicable to this invention include both aliphatic and aromatic dicarboxylic acid anhydrides, either saturated or unsaturated, for example, succinic, adipic, maleic, glutaric, phthalic and sebacic anhydrides, naphthalene dicarboxylic acid anhydrides, etc. Endocisbicyclo-(2,2,1) - 5 - heptene - 2,3 - dicarboxylic anhydride (sold under the trademark, "Nadic" anhydride) and 1,4,5,6,7,7 - hexachlorobicyclo - (2,2,1) - 5 - heptene-2,3-dicarboxylic anhydride (sold under the trademark "Chlorendic" anhydride) are also desirable. Other useful anhydrides are pyromellitic dianhydride and trimellitic anhydride. The reaction, when an anhydride is used, involves the opening of the anhydride group by reaction with a hydroxyl or water to form carboxyl groups since anhydride groups and epoxide groups do not readily react. The carboxyl groups which result from the anhydride reaction then react with the epoxide groups, the carboxyl groups and epoxide groups having a greater affinity for each other. It is understood, therefore, that the corresponding acids can be used in lieu of the anhydrides mentioned hereinbefore. In addition, carboxyl copolymers are known cross linking agents, for example, a copolymer made by the polymerization of acrylic acid with styrene. The reaction of the carboxy copolymers with epoxides is also accelerated in accordance with this invention.

When polyhydric phenols are employed in polyepoxide accelerator compositions of the invention, the polyhydric phenols employed are mono- or polynuclear phenols having two or more phenolic hydroxyl groups linked to separate nuclear aromatic carbon atoms. Among suitable compounds of this class tre mono-nuclear phenols, for example, resorcinol, catechol, orcinol, xylorcinol, apionol, etc., as well as polynuclear phenols such as bis(4-hydroxyphenyl)-2,2-propane (Bisphenol A), 4,4'-dihydroxybenzophenone, bis(4-hydroxyphenyl)-1,1-ethane, bis(4-hydroxyphenyl)-1,1-isobutane, bis(4-hydroxyphenyl)-2,2-butane, bis(4-hydroxy-2-methylphenyl)-2,2-propane, bis (4-hydroxy-2-tert-butyl phenyl)-2,2-propane, bis(2-hydroxynaphthyl)-methane, 1,3-dihydroxynaphthalene, 1,2-5,6-tetrahydroxynaphthalene, etc. The polyhydric phenols well suited for use in the invention are of the formula $R(OH)_m$, where $n$ is an integer of 2 to 4, each hydroxyl group being linked directly to a different nuclear carbon atom of R which is an aromatic hydrocarbon radical.

One class of polyhydric phenols particularly useful as curing agents is the group of compounds containing more than two phenolic hydroxyl groups per mol. Examples of compounds of this type are phloroglucinol, pyrogallol, 1,2,4 - trihydroxybenzene, 6-methyl-1,2,4-trihydroxybenzene, and other trihydric phenols such as phenol-aldehyde condensates. Desirable phenol-aldehyde condensates are commercial thermoplastic resins made from phenols or alkyl phenols and formaldehyde and having more than two phenolic hydroxyls per mol, say, two to about twelve.

Another class of polyhydric phenols useful as curing agents is the diphenols. By diphenol is meant (a) a polynuclear phenol having two phenolic hydroxyl groups as its sole reactive groups such as dihydroxydiphenylmethanes, their isomers, their homologs, and their substituted compounds and (b) a benzene ring having two hydroxyls such as resorcinol, and the like. Included in addition to resorcinol are other dihydric phenols, for example, hydroquinone and catechol. Examples of such compounds are 4,4'-diphenols made by the condensation of phenols with aldehydes and dihydroxydiphenylmethane, dihydroxydiphenylmethylmethane, dihydroxydiphenyldimethylmethane, dihydroxydiphenylethylmethane, dihydroxydiphenyldiethylmethane, dihydroxydiphenylmethylpropylmethane, and dihydroxydiphenylethylphenylmethane. Also, important are compounds containing two benzene nuclei linked to each other directly or through other atoms or atom groups, for example, $—(CH_2)_n—$, $—SO_2—$, $—O—$, $—CO—$ and $—CR_2—$, and having two phenolic hydroxyl groups as their sole reactive groups.

The amount of phenol employed in the composition, depends on many factors such as the type of polyhydric phenol and the epoxide content of the polyepoxide. Good cures are obtained by reacting the polyepoxides with one or more phenolic hydroxyls per epoxide group of polyhydric phenol and from 0.05 percent to one percent by weight of the polyepoxide-phenol mixture of the ammonium or alkali metal halide or thiocyanate salt. Generally, from 0.1 to 1 phenol equivalent weight per phenolic hydroxyl) is employed per epoxide group (one epoxy equivalent), the accelerator being utilized in an amount of from 0.075 to 0.5 percent by weight of the resin, i.e., a resin containing both polyepoxide and polyhydric phenol. However, in the case of polyfunctional phenols such as phenol formaldehyde condensates, tri- and tetrahydric phenols, etc., cross linking can be obtained with a ratio of greater than one phenolic hydroxyl per epoxy equivalent.

By proper selection of phenol and by proper adjustment of the amount of activator virtually any desired curing temperature can be employed. Excellent rates of cure are obtained at temperatures ranging from about 100° C. to about 200° C. or higher.

Polyhydric alcohols are reacted with polyepoxides under cross linking conditions in a manner similar to polyhydric phenols. And, as in the case of phenols, the catalyzation of the reaction is almost essential, the primary alcoholic hydroxyl groups reacting more readily with epoxide groups than secondary alcoholic hydroxyl groups. Considering polyhydric alcohols, most extensively used are polyethylene glycols. Glycols having a wide molecular weight range say from 62 to 2000 are very effective. Other polyhydric alcohols employed in reaction with the polyepoxides are pentaerythritol, 2,3-butanediol, ethylene glycol, propylene glycol, trimethylene glycol, 1,4-dihydroxy-2-butene, 1,12-dihydroxyoctadecane, 1,4-dihydroxycyclohexane, 2,2-dimethyl-1, 3-propanediol, 2-ethyl-2 butylpropanediol-1,3, glycerol, erythritol, sorbitol, mannitol, inositol, trimethylol propane and dipentaerythritol. Curing temperatures are generally the same as in the case of polyhydric phenols, or perhaps a little bit higher and in some instances, as high as 300° C. Generally, however, 175° C. to 200° C. is adequate. Alcohols are used in equivalent or slightly less than equivalent amounts, usually in about the same proportion as phenols, that is 0.1 to 1 alcoholic hydroxyl equivalent per 1 epoxy equivalent.

The invention can best be illustrated by reference to specific examples. However, it is to be understood that the examples are for the purposes of illustration only and are not to be construed as limiting the invention in any of its broader aspects. The effect of the salts of the invention on curing schedules of known epoxide curing agents is measured by preparing castings of epoxide resins. The curing agent with and without the salt is combined with the epoxide resin, the mixture is heated in an aluminum cup and gel times are determined. A fast gel time indicates a rapid cure.

The polyepoxides used in Table 1 and the following examples are prepared by the condensation of varying proportions of epichlorohydrin to hydroxyl compound and subsequent dehydrohalogenation with sodium hydroxide. The table which follows indicates the ratio of epichlorohydrin to Bisphenol A used to prepare the polyepoxides. In Table 1 and the examples, the polyepoxides will be referred to as Epoxide A, and Epoxide B.

| Epoxide | Reaction Mixture (Mols) | | Hydroxy Compound | Epoxide Equivalent |
|---|---|---|---|---|
| | Epichlorohydrin | Hydroxy Compound | | |
| A | 10 | 1 | Bisphenol A | 190 |
| B | 2.6 | 1 | do | 270 |

Epoxide C is 3,4-epoxy-6-methylcyclohexylmethyl-3,4-epoxy-6-methylcyclohexanecarboxylate having an epoxide equivalent weight of about 160.

Example 1

In a one liter flask, 20 grams of a polyepoxide made up mainly of the Epoxide A and 8 grams of phthalic anhydride are heated to 100° C. with stirring until the phthalic anhydride dissolves. Into the mixture is added with stirring, .28 gram potassium thiocyanate employed in a 10 percent methanol solution. The flask contents are then poured into an aluminum cup and heated in an oven at 150° C. until gelled. The mixture gels in 50 minutes. Without the potassium thiocyanate, no gel is obtained in 8 hours. Additional blends of epoxide resins with phenols, acids, anhydrides, and alcohols are prepared and curbed using a variety of alkali metal halides as catalysts. These preparations and their results are shown in Table 1.

TABLE I

| Epoxide | Grams of Epoxide | Co-reactant | Grams of Co-reactant | Catalyst [3] (Percent) | Catalyst solution (Percent) | Temperature ° C. | Gel Time |
|---|---|---|---|---|---|---|---|
| A | 20 | Phthalic Anhydride | 8 | 0.1 LiBr | 10 in Methanol | 150 | 1 hour. |
| A | 20 | do | 8 | 0.1 LiCl | do | 150 | Do. |
| A | 20 | do | 8 | 0.1 LiI | do | 150 | Do. |
| A | 20 | do | 8 | 0.1 NaI | do | 150 | Do. |
| A | 20 | do | 8 | 0.1 NH₄SCN | do | 150 | 4.5 hours. |
| A | 20 | do | 8 | None | | 150 | No gel in 8 hrs. |
| A | 10 | DDSA [1] | 12 | 0.1 LiBr | 10 in Methanol | 150 | 3 hrs. and 45 min. |
| A | 10 | DDSA [1] | 12 | 0.1 NaI | do | 150 | 3 hrs. and 45 min. |
| A | 10 | DDSA [1] | 12 | 0.1 KSCN | do | 150 | 2 hrs. and 40 min. |
| A | 10 | DDSA [1] | 12 | None | | 150 | 16 hours. |
| A | 20 | Bisphenol A | 4 | 0.1 LiBr | 10 in Methanol | 150 | 3 hours. |
| A | 20 | do | 4 | 0.1 LiCl | do | 150 | Do. |
| A | 20 | do | 4 | None | | 150 | No gel in 8 hrs. |
| A | 20 | Resorcinol | 2 | 0.1 LiBr | 10 in Methanol | 150 | 1 hour. |
| A | 20 | do | 2 | 0.1 LiCl | do | 150 | 2 hours. |
| A | 20 | do | 2 | None | | 150 | No gel in 8 hrs. |
| A | 19 | Trimethylol Propane | 4.5 | 0.1 LiBr | 10 in Methanol | 150 | 6 hrs. and 15 min. |
| A | 19 | do | 4.5 | 0.1 KCSN | do | 150 | 12 hours. |
| A | 19 | do | 4.5 | 0.5 LiBr | do | 150 | 1 hr. and 15 min. |
| A | 19 | do | 4.5 | 0.5 KSCN | do | 150 | 15 minutes. |
| A | 19 | do | 4.5 | None | | 150 | No gel in 20 hrs. |
| B | 20 | HHPA [2] | 14 | 0.1 LiBr | 10 in Methanol | 150 | 45 minutes. |
| B | 20 | HHPA [2] | 14 | None | | 150 | 3 hrs. and 10 min. |
| C | 15 | Phthalic Anhydride | 14 | 0.1 KSCN | 10 in Methanol | 150 | 10 minutes. |
| C | 15 | do | 14 | 0.1 NaI | do | 150 | Do. |
| C | 15 | do | 14 | 1. MeOH | | 150 | 25 minutes. |
| C | 15 | do | 14 | None | | 150 | Do. |

[1] Dodecenylsuccinic anhydride. [2] Hexahydrophthalic anhydride. [3] Percent salt based on mixture, salt being employed as a 10% solution.

Example 2

In a one liter flask, 190 grams of a 50.6 percent solids solution of a 65/20/15 vinyl toluene/ethyl acrylate/acrylic acid copolymer in 90/10 xylene/2-ethoxyethanol acetate are blended with 40.7 grams of Epoxide A. To this mixture 108.5 grams of 2-ethoxyethanol acetate are added to reduce the solution to 40 percent solids. The resulting blend is divided into 25 gram portions. A 10 percent catalyst solution is then prepared by dissolving 2.3 grams of sodium iodide in methanol. To each 25 gram portion of the blend, is added with stirring, 1 cc. of the catalyst solution. From one catalyzed portion, 3 mil films are drawn down on glass plates. On heating at 300° F. for 30 minutes, flexible, well cured films with good adhesion and solvent resistance are produced. The stability of another catalyzed portion, determined at 120° F. after a period of 7 days, shows an increase in viscosity (Gardner-Holdt) of from D–E to G.

Additional epoxide resin-carboxy copolymer solutions are prepared using other alkali metal salts as catalysts. Properties of these preparations are listed in Table 2.

ties was evident. It has been pointed out that reactions of many curing agents with polyepoxides are accelerated in accordance with this invention, and that the amount of salt used to accelerate the cure will depend on a particular curing agent. This and other variations will be

TABLE II

| Film Applications | | Time | Remarks | Stability at 120° F. | |
|---|---|---|---|---|---|
| Catalyst | Temperature, ° F. | | | Initial Viscosity | Viscosity after 3 days |
| 1% LiCl | 300 | ½ hr | Good solvent resistance, flexible films, good adhesion. | D–E | R. |
| 1% KSCN | 300 | ½ hr | ----do---- | D–E | I. |
| 1% NH₄SCN | 350 | ½ hr | ----do---- | D–E | E. |
| 1% LiBr | 300 | ½ hr | ----do---- | D–E | G. |
| 1% Dimethyl aminomethyl phenol. | 300 | ½ hr | ----do---- | D–E | Gel. |

*Example 3*

In accordance with Example 1, but at room temperature, 19.4 grams of hexahydrophthalic acid anhydride are mixed with 20 grams of a polyepoxide, the polyepoxide having been previously prepared by reacting 3 mols of epichlorohydrin with glycerol, using an acid catalyst, to form a polyhalohydrin ether, and dehydrohalogenating the resulting halohydrin ether to form the polyepoxide. The resulting polyepoxide has an epoxide equivalent weight of about 155. The hexahydrophthalic acid anhydride-glycidyl polyether mixture is blended with 0.1 percent lithium bromide employed as a 10 percent solution in methanol. The mixture is then poured into an aluminum cup and heated in an oven at 150° C. until gelled. The mixture gels in 27 minutes.

The following examples demonstrate the ineffectiveness of sodium chloride and potassium chloride as curing accelerators.

*Example 4*

In a suitable beaker, 8 grams of phthalic anhydride are dissolved in 20 grams of Epoxide A, by heating with stirring to 100° C. When solution is attained, 10 drops of a 10 weight percent solution of sodium chloride in water are added. When thoroughly mixed, the beaker contents are poured into an aluminum cup and are heated in an oven at 150° C. Within a few minutes, the sodium chloride is precipitated from the solution and after 55 minutes the resin has gelled around the salt particles while the remainder of the resin is ungelled.

Similar results are obtained when 10 drops of a 10 weight percent solution of potassium chloride are used in place of the sodium chloride.

*Example 5*

Using the same procedure as described in Example 4, 2 grams of resorcinol are dissolved in 20 grams of Epoxide A. When solution is attained, 10 drops of a 10 weight percent solution of sodium chloride in water are added. When thoroughly mixed, the beaker contents are poured into an aluminum cup and are heated in an oven at 150° C. The salt does not stay in solution and no gel is obtained after 6 hours heating.

Similar results are obtained when potassium chloride is used in place of sodium chloride.

From the foregoing examples and tables, it is readily seen that the ability of the salts of this invention to accelerate a reaction of polyepoxides with curing agents is very pronounced. Table 1, for example, shows that cures can be obtained in 1 to 3 hours where 8 to 16 hours were previously required. In addition, no loss of properties was evident. It has been pointed out that reactions of many curing agents with polyepoxides are accelerated in accordance with this invention, and that the amount of salt used to accelerate the cure will depend on a particular curing agent. This and other variations will be obvious to one skilled in the art and are deemed to be within the scope of this invention.

The embodiments of the invention in which an exclusive property or privilege is claimed are defined as follows:

1. A heat curable composition of matter comprising
   (A) a polyepoxide having a 1,2 epoxy equivalency greater than one and an epoxide equivalent weight of about 50 to 4000,
   (B) a cross-linking agent selected from at least one member of the group consisting of
      (a) polycarboxylic acids,
      (b) polycarboxylic acid anhydrides,
      (c) polyhydric phenols containing no more than about 12 phenolic hydroxyls per mol, and
      (d) polyhydric alcohols in admixture in a ratio of 0.5 to 1 equivalent of the acids and anhydrides per epoxide equivalent of the polyepoxide and 0.1 to 1 equivalent of the phenols and alcohols per epoxide equivalent of the polyepoxide, and
   (C) as a curing accelerator, from 0.05 to 1 weight percent based on the total weight of the polyepoxide and cross-linking agent of a salt selected from at least one member of the group consisting of
      (a) sodium, potassium, lithium and ammonium bromides, iodides, and thiocyanates, and
      (b) lithium and ammonium chlorides.

2. The composition of claim 1 wherein the polyepoxide is a glycidyl polyether of a polyhydric phenol having an epoxide equivalent of 140 to 1000, wherein the anhydride is a dicarboxylic acid anhydride and wherein the salt is ammonium thiocyanate.

3. The composition of claim 1 wherein the polyepoxide is a glycidyl polyether of a polyhydric phenol having an epoxide equivalent of 140 to 1000, wherein the phenol is a dihydric phenol and wherein the salt is lithium iodide.

4. The composition of claim 1 wherein the polyepoxide is a glycidyl polyether of a polyhydric phenol, wherein the acid is a copolymer of acrylic acid, ethyl acrylate and vinyl toluene and wherein the salt is potassium thiocyanate.

5. The composition of claim 1 wherein the polyepoxide is the diglycidyl ether of bis (4-hydroxyphenyl)-2,2-propane, the anhydride is hexahydrophthalic anhydride and the salt is potassium iodide.

6. The infusible, insoluble composition resulting from the composition of claim 1.

7. The composition of claim 1 wherein the polyepoxide is free of hydrolyzable chlorine atoms.

8. The composition of claim 7 wherein the polyepoxide is 3,4 - epoxycyclohexylmethyl-3,4-epoxycyclohexanecarboxylate, wherein the anhydride is a dicarboxylic acid anhydride and wherein the salt is ammonium thiocyanate.

9. The composition of claim 7 wherein the polyepoxide is vinyl cyclohexene dioxide, the phenol is a dihydric phenol and the salt is lithium iodide.

10. The composition of claim 7 wherein the polyepoxide is 3,4-epoxy-6-methylcyclohexylmethyl-3,4-epoxy-6-methylcyclohexanecarboxylate.

References Cited by the Examiner
UNITED STATES PATENTS 3,006,892   10/1961   Nikles _____ 260—47

MURRAY TILLMAN, Primary Examiner.
P. LIEBERMAN, Assistant Examiner.